Oct. 9, 1923. 1,470,112
J. B. COTTAM
BEEHIVE HOOD AND CONDITION INDICATOR
Filed July 21, 1922
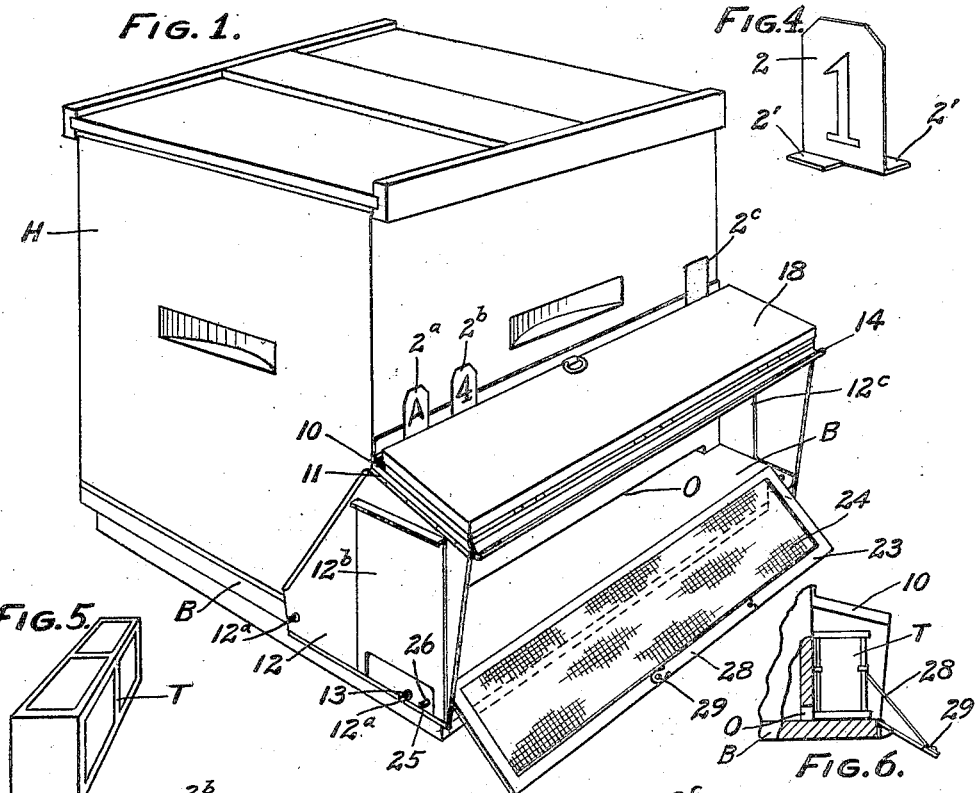
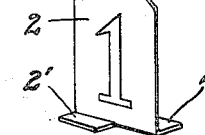
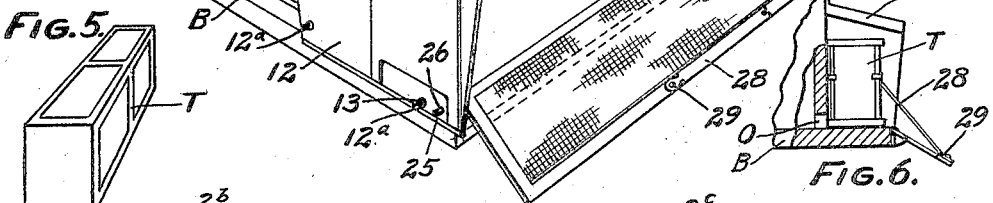
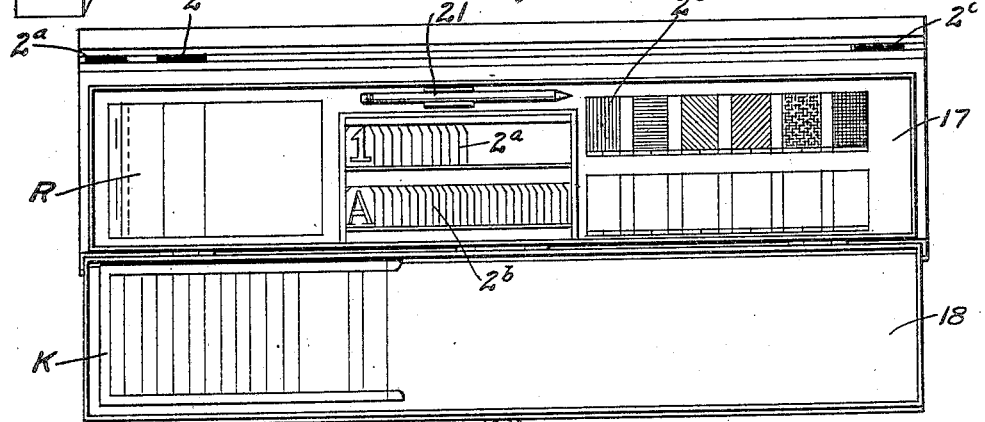
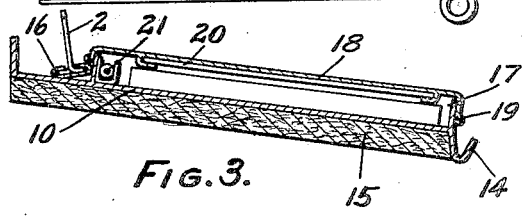
INVENTOR
JOHN B. COTTAM
BY Hazard & Miller
ATT'YS.

Patented Oct. 9, 1923.

1,470,112

UNITED STATES PATENT OFFICE.

JOHN B. COTTAM, OF MONTECITO, CALIFORNIA.

BEEHIVE HOOD AND CONDITION INDICATOR.

Application filed July 21, 1922. Serial No. 576,573.

*To all whom it may concern:*

Be it known that I, JOHN B. COTTAM, a citizen of the United States, residing at Montecito, in the county of Santa Barbara and State of California, have invented new and useful Improvements in Beehive Hood and Condition Indicators, of which the following is a specification.

This invention relates to an apiarist's apparatus, and more particularly to an attachment to hives of the box form.

It is an object of the present invention to provide a device for facilitating the record keeping of a colony of bees, and to provide a device applicable to a beehive and which includes a case for holding record forming paraphernalia and which also forms a protecting hood from rain and sun in front of the beehive entrance.

Another object is to provide an attachment including a sanitary, ventilated alighting board or bee landing. A further object is to provide an attachment or device combined with a beehive in such manner as to form a receiver for any convenient and suitable form of bee trap applicable to the front of the hive for catching the bees. Another object is to provide means for holding an applied bee trap snugly in position to prevent accidental dislodgment.

A further object is to provide a means to which may be readily attached a removable tag or symbol device for indicating the number, name and other data, as for instance the condition of the hive, so that the desired information can be readily obtained without necessitating interior examination of the hive.

A broad object of the invention consists in providing a record keeping apparatus capable of being used for giving various details of information as to a beehive or colony, and which consists of elements selectively serviceable and adapted to be arranged upon the hive in a conspicuous manner so that the attendant may readily attend to the hives as may be indicated according to the given selected and set symbol numbers.

Other objects will be made manifest in the following specification of an embodiment of the invention illustrated in the accompanying drawings, in which—

Figure 1 is a perspective of a conventional form of beehive showing the protecting hood and symbol support attached thereto.

Fig. 2 is a plan of the hood showing its cover opened to disclose the record keeping apparatus.

Fig. 3 is a vertical cross section through the upper part of the hood showing details of construction.

Fig. 4 is a perspective of one of the system devices being a number plate.

Fig. 5 is a perspective illustrating diagrammatically a conventional form of the trap.

Fig. 6 is a detail sectional view illustrating the arrangement of the trap below the hood and showing its fastening device.

The extensive industry relative to bee growing and honey producing has developed the necessity of providing a simple, practicable, inexpensive and ample form of apparatus for providing for the efficient management and maintaining of a colony or colonies of bees. Apiarists have now reduced bee keeping to a scientific basis and frequently the apiarists have extensive colonies requiring several attendants. To that end, my invention involves the provision of means for facilitating the proper, prompt and requisite service according to the various individual hives and colonies in an establishment. To that end, I provide a set of record keeping devices forming condition and index symbols which may be characterized in various manners. For instance, by my system a series of substantial and preferably metal symbol members 2 are utilized, and certain of these members may constitute index guides as alphabetically characterized members 2$^a$ and the numeral members 2$^b$, so that it is possible by the utilization of a relatively small number of the symbol members to provide for a very great range of service, as for instance in order to keep down the number of parts after a colony or beehive had been given the index 999, instead of adding an additional digit for the thousand, an alphabetic series may then be started as for utilizing A as a prefex to the indexing system of number, as shown in Fig. 1, by serial members "A$^4$". From this it will be seen that by providing a suitable number of the alphabetic index members and a suitable number of the number members, great range is provided for numerically identifying the colonies.

Further, my present system includes the provision of a number of symbol members 2ᶜ which may be variously colored or otherwise characterized, and each may stand for a given condition or state of the beehive or colony as is indicated by the following: red, blue, black, pink, sky blue, green, orange, yellow, gray, brown, white.

Each of these colored symbol members 2ᶜ would have its respective value in a descriptive condition system as for instance would be shown by a key card K and which is provided with the following data:

Red_____American foul brood.
    Blue_____European foul brood.
    Black_____colony dead.
    Pink_____strong colony.
    Sky blue_____short of stores.
    Green_____preparing to swarm.
    Orange_____requeen.
    Yellow_____moth infected.
    Gray_____laying worker.
    Brown_____honey bound.
    White_____O. K.

To readily apply the condition and index members to any given colony and hive, I have provided an attachment, or device which may be constructed initially with the hive, for holding such of the index members as may be desired immediately at each of the hives so that the manager and assistants, according to his predetermined duties, can quickly ascertain the condition of the hive by examination thereof and then set or adjust the necessary symbol members in conspicuous position at the hive.

To that end, the invention involves a hood-like structure having a roof plate 10, to the transverse ends of which there are movably and preferably hingedly connected at 11 side panels or plates 12, these being of such form as to be applicable over the lower portion of the front corners of the hive H, as clearly shown in Fig. 1. To facilitate attachment of the device, screws 13, or other headed device, can be driven into the bottom B of the hive, and over these will be passed the edges of slots 12ᵃ provided in the lower portion of each of the end panels 12. The slots 12ᵃ are preferably disposed obliquely as to the plane of the bottom B and thus form hook-like fastening means when engaging the screws 13. The upper edges of the end panels 12, when the latter are applied, preferably extend downwardly and forwardly so as to hold the hood or top plate 10 in an inclined position so as to shed rain forwardly and downwardly into a longitudinal gutter 14 along the front eave of the hood. To prevent the accumulation of an undesirable degree of heat below the hood 10 any heat insulating medium may be applied thereto, as an insulating board 15 shown in Fig. 3.

To provide for the convenient attachment and secure holding of the various symbol members 2, the upper portion of the hood 10 is provided with a longitudinally extending guideway or channel 16 to receive the flanges 2' provided on the bottom of the members 2, so that these latter may be held in substantially applied position in front of the beehive to be conspicuously disclosed.

For convenience and for time saving and labor saving, and also for the purpose of reducing the possibility of loss of the various symbol members, there is provided upon the top of the hood 10 a receiver which may consist of a shallow longitudinally extending box 17 which is provided with a cover 18 preferably hinged along the front edge of the hood as at 19. The box walls project upwardly and the cover is provided with a marginal flange adapted to close down over the wall of the box so as to make a substantially rain proof receiver in which may be retained a record manifold hook R which provides for the entry of a record after inspection by the inspector of the bee-hive. One copy of a record on a given date is left in the receiver on top of the hood, and another copy is taken to the office of the apiarist for permanent record. It will be seen that this provides for a record, after each inspection, being kept immediately at each beehive or colony, and a record being kept in a permanent file in the office.

Contained in the receiver is also a series of the index members 2ᵃ and 2ᵇ. There is also maintained within the receivers a set of the condition symbol members 2ᶜ, so that as soon as an inspection has been made of the hive, the proper condition symbol 2ᶜ is selected and arranged as is shown in Fig. 1, the selected symbol, in this case, being white and indicating O. K. condition. The meaning of each of the condition symbols is readily ascertained by reference to the guide or key card K, and this is preferably securely attached to a portion of the device, as for instance by being mounted in a holder which consists of a transparent window or covering piece 20 provided conveniently on the inside of the hinged cover 18.

It will be seen that when the cover is open, the contents of the receiver are fully exposed and are conveniently accessible, and for convenience a pencil holder and pencil 21 are provided in the receptacle.

Another feature of the invention resides in the provision of a ventilated and sanitary form of alighting plane or bee landing, and this I provide in the form of a substantial frame 23 carrying a sheet of foraminous material, such as a piece of woven screen 24 of suitable mesh. This landing is adapted to be readily applied to the hood when the latter is unfolded and attached to the beehive as shown in Fig. 1. The frame 23 is provided with end pintles 25, and these are adapted to be passed into apertures 26 provided therefor in the end panels 12 and thus provide for the arrangement of the bee landing 24 in a position in front of the lip of the bottom B above which is provided the hive opening O. This form of bee landing provides for the ample ventilation of the subjacent platform or structure upon which the hive may be arranged. This is desirable since, if a solid or imperforate bee landing is utilized, the lower surfaces thereof and adjacent thereto will become mildewed and damp and unsanitary and result in illness and death of the bees.

It is often desirable to trap a portion or all of the bees in a given hive, and in such case it is usual to apply a trap, a form of which is conventionally illustrated at T, in Fig. 5, and is applied over the opening O of the hive so as to catch the bees. To accommodate such device, the present invention shows one of the panels 12 as being provided with an end gate 12$^b$ which may be lifted to provide for the insertion of the trap T. To hold the trap in place, there is provided a brace 28 which is foldably connected at 29 so as to be swung to an upwardly extending position as shown in Fig. 6 to engage and prop up the applied trap T.

In my companion application S. N. 576,574 filed the 22nd day of July, 1922, there is shown an adjustable entrance closure, and to permit of the application of such closure to the hive H of the present adaptation, one of the end panels is provided with a small door or gate 12$^c$ which may be opened to permit the insertion of the above mentioned entrance closure.

It will be seen that my invention provides for the removal of a hive rearwardly from its bottom board and enables the application of another hive without removing or dismounting the covering hood.

Further embodiments, modifications and changes may be resorted to within the spirit of the invention as here claimed.

What is claimed is:

1. A protecting device for beehives, including a hood attachable to the front of a hive to overhang the hive entrance, the hood having a hollow roof, the upper portion of which is movable to provide access to the chamber within the roof.

2. A protecting device for beehives, including a hood attachable to the front of a hive to overhang the hive entrance and having end panels, the end panels having slots to set over supporting shanks provided therefor.

3. A protecting device for beehives, including a hood attachable to the front of a hive to overhang the hive entrance and having end panels, one of the end panels having an opening for the insertion of a bee trap.

4. A protecting device for beehives, including a hood attachable to the front of a hive to overhang the hive entrance and having end panels, one of the end panels having an opening for the insertion of a bee trap, and a foldable prop for bracing the applied trap.

5. In combination with a beehive, a foraminous bee landing through which light and air may pass, and a hood having end panels to which said landing is foldably attached to be extended outwardly in front of the hood.

In testimony whereof I have signed my name to this specification.

JOHN B. COTTAM.